United States Patent
Sakamoto et al.

[11] Patent Number: 5,988,771
[45] Date of Patent: Nov. 23, 1999

[54] PRESSURE CONTROL VALVE EQUIPPED WITH A SOLENOID VALVE

[75] Inventors: Kazunori Sakamoto; Yoshihiro Kitagawa; Yasuo Nakao, all of Kobe; Mitsumasa Morita, Miki; Tadashige Eto, Kobe; Hiroaki Fukushita, Akashi, all of Japan

[73] Assignee: Nabco, Ltd., Kobe, Japan

[21] Appl. No.: 08/891,217

[22] Filed: Jul. 10, 1997

[30] Foreign Application Priority Data

Jul. 22, 1996 [JP] Japan ................................. 8-211889

[51] Int. Cl.⁶ ..................................................... B60T 8/36
[52] U.S. Cl. ............................................ 303/119.3; 303/50
[58] Field of Search .................................. 303/119.3, 50, 303/15, 20, 40, 54, 7, 3, 14, 81, 16, 22.6, 22.7, 33, 118.1, 119.2; 137/84, 85, 86, 625.65, 627.5, 596.16

[56] References Cited

U.S. PATENT DOCUMENTS

| 3,653,729 | 4/1972 | Newell et al. ........................... 303/50 |
| 4,898,203 | 2/1990 | Kobelt ..................................... 137/269 |
| 5,395,164 | 3/1995 | Sulzyc ...................................... 303/15 |

*Primary Examiner*—Christopher P. Schwartz
*Assistant Examiner*—Melanie Talavera
*Attorney, Agent, or Firm*—James Ray & Associates

[57] ABSTRACT

A pressure control valve equipped with a solenoid valve, in which a main valve body is provided with an air-supply chamber connected to a pressurized air source, a control pressure chamber into which pilot pressure is input, an output chamber connected to an air-pressure apparatus, and an air-supply valve which establishes contact between and isolates such air-supply chamber and such output chamber. Such pressure control valve further includes a pressure-adjusting piston which is urged one way by a pressure-adjusting spring and is urged the other way by such pilot pressure of such control pressure chamber, and a hollow exhaust valve rod is provided integrally with such pressure-adjusting piston to open or close such air-supply valve in accordance with such pilot pressure; and in which such solenoid valve supplying such pilot pressure to such control pressure chamber is attached to such main valve body. Such pressure control valve is characterized in that such valve body of such solenoid valve is fitted in one of an upper surface and a lower surface of such valve main body, in a position in which it is adjacent to such exhaust valve rod.

2 Claims, 7 Drawing Sheets

PRESSURE CONTROL VALVE EQUIPPED WITH A SOLENOID VALVE

FIELD OF THE INVENTION

The present invention relates, in general, to a pressure control valve equipped with a solenoid valve, and, in particular, the present invention relates to a pressure control valve equipped with a solenoid valve used in the air pressure circuit of a brake device of a railroad vehicle.

BACKGROUND OF THE INVENTION

Conventionally, the brake devices in railroad vehicles have been provided with pressure control valves equipped with solenoid valves, in which a solenoid valve outputting brake command pressure matched with a brake pressure command signal output by a brake receiver is integrated with a pressure control valve, for example, a relay valve. Such pressure control valve receives the brake command pressure output by the solenoid valve, in a command pressure chamber in the form of pilot pressure and subjects such brake command pressure to volume amplification before outputting it to a brake cylinder. Such a system is taught, for example, in Japanese Laid-Open Utility Model Application H.

In this pressure control valve equipped with a solenoid valve, the main valve body is provided with an air-supply chamber connected to a pressurized air source, a control pressure chamber into which the pilot pressure from the solenoid valve is input, an output chamber connected to the brake cylinder, and air-supply valve which selectively establishes contact between and isolates such air-supply chamber and output chamber. Such control valve further includes a pressure-adjusting piston which is urged one way by a pressure-adjusting spring and is urged the other way by the pilot pressure of the control pressure chamber. Additionally, there is a hollow exhaust valve rod provided integrally with this pressure-adjusting piston. The air-supply valve is opened or closed depending on the pilot pressure input into the control pressure chamber, and thus the compressed air supplied to the air-supply chamber can be supplied to the brake cylinder at a pressure corresponding to the pilot pressure.

Now, in such conventional pressure control valves equipped with a solenoid valve, such solenoid valve, which supplies the pilot pressure to the control pressure chamber, is disposed to the side of the main valve body. Thus, the projected planar surface area is large and a large amount of space is needed when it is mounted below the floor of a vehicle. There is, therefore, a problem in that the space below the floor of the vehicle cannot be used efficiently.

SUMMARY OF THE INVENTION

The present invention provides a pressure control valve equipped with a solenoid valve in which the main valve body is provided with an air-supply chamber connected to a pressurized air source, a control pressure chamber into which pilot pressure is input, an output chamber connected to an air-pressure apparatus and an air-supply valve which establishes contact between and isolates such air-supply chamber and output chamber. Such pressure control valve further includes a pressure-adjusting piston which is urged one way by a pressure-adjusting spring and is urged the other way by such pilot pressure of such control pressure chamber, and a hollow exhaust valve rod is provided integrally with this pressure-adjusting piston to open or close the air-supply valve in accordance with such pilot pressure; and in which such solenoid valve supplying pilot pressure to the control pressure chamber is attached to such main valve body. Such pressure control valve is characterized in that the valve body of such solenoid valve is fitted in the upper surface or the lower surface of such main valve body, in a state in which it is adjacent to such exhaust valve rod.

OBJECTS OF THE INVENTION

It is, therefore, one of the primary objects of the present invention to provide a pressure control valve which is able to reduce the projected planar surface area and thus reduce the mounting space.

It is also another object of the present invention to provide a pressure control valve in which a solenoid is fitted in one of an upper surface and a lower surface of such pressure control valve.

Yet another object of the present invention is to provide a pressure control valve in which it is possible to shorten an air passage from the control pressure chamber to such solenoid valve.

It is still another object of the present invention to provide a pressure control valve equipped with a solenoid valve in which the fastening and unfastening of such pressure control valve is facilitated.

In addition to the several objects and advantages of the present invention which have been described in detail above, various other objects and advantages will become more readily apparent to those persons skilled in the pressure control valve and solenoid valve art from the following more detailed description of such invention, particularly, when such description is taken in conjunction with the attached drawing Figures and with the appended claims.

Figure 1:
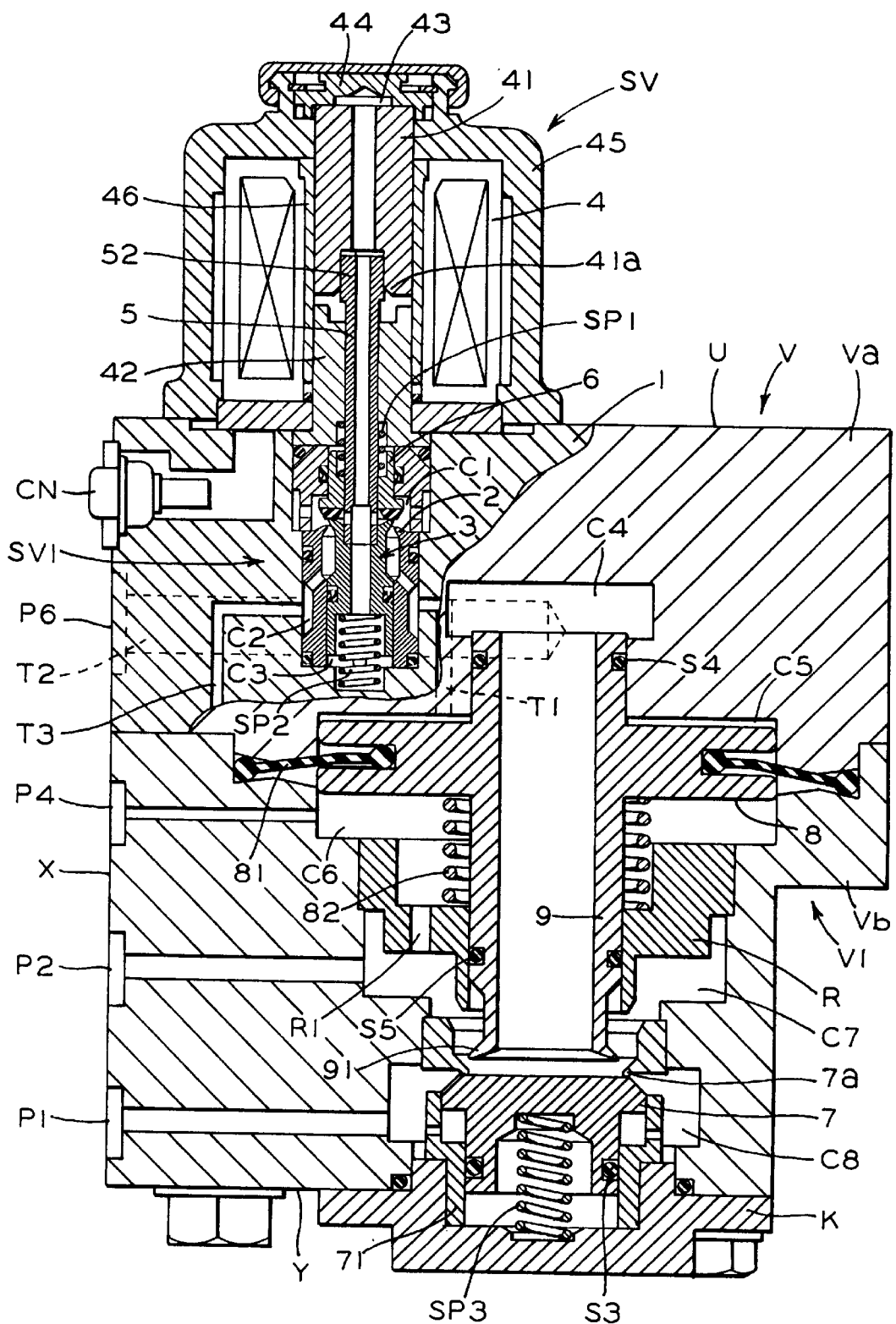
FIG. 1 is a cross sectional view showing a pressure control valve equipped with a solenoid valve in one embodiment of the present invention.

BRIEF DESCRIPTION OF THE PRESENTLY PREFERRED AND VARIOUS ALTERNATIVE EMBODIMENTS OF THE INVENTION

Prior to proceeding to the more detailed description of the present invention, it should be noted that for the sake of clarity in understanding the invention, identical components with identical functions have been designated with identical reference numerals A presently preferred embodiment of this invention is described in detail below with particular reference to the attached Figures.

Figure 2:
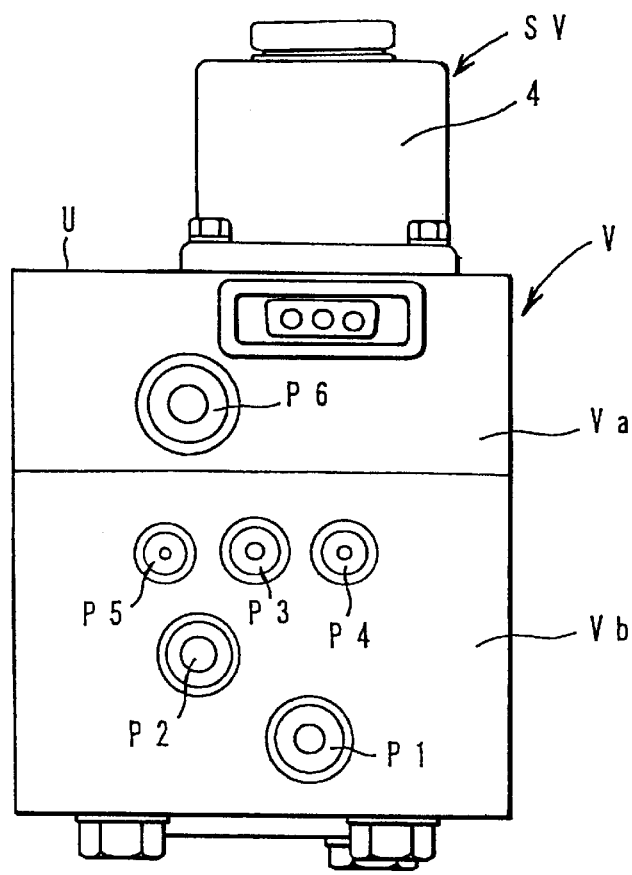
FIG. 2 is a side view of the pressure control valve equipped with a solenoid valve illustrated in FIG. 1.

FIG. 1 is a cross section of the pressure control valve, generally designated V, equipped with a solenoid valve, generally designated SV, showing one particular embodiment of the present invention. FIG. 2 is a side view of the pressure control valve V. This pressure control valve V, equipped with solenoid valve SV, is used in the brake device of a railroad vehicle. A valve body generally designated SV1, of the solenoid valve SV which supplies pilot pressure to the pressure control valve V, is fitted and integrated at upper surface U of the main valve body V1 of such pressure control valve V.

Solenoid valve SV includes an upper portion, having the solenoid 4 disposed therein, and a lower valve body portion. The lower valve body portion is fitted in toward the tube seating attachment surface X of the main valve body V1, being on the upper surface U of upper casing Va comprised in main valve body V1 of pressure control valve V, in a position in which it is adjacent to control pressure chamber C5 of such pressure control valve V.

Figure 4:
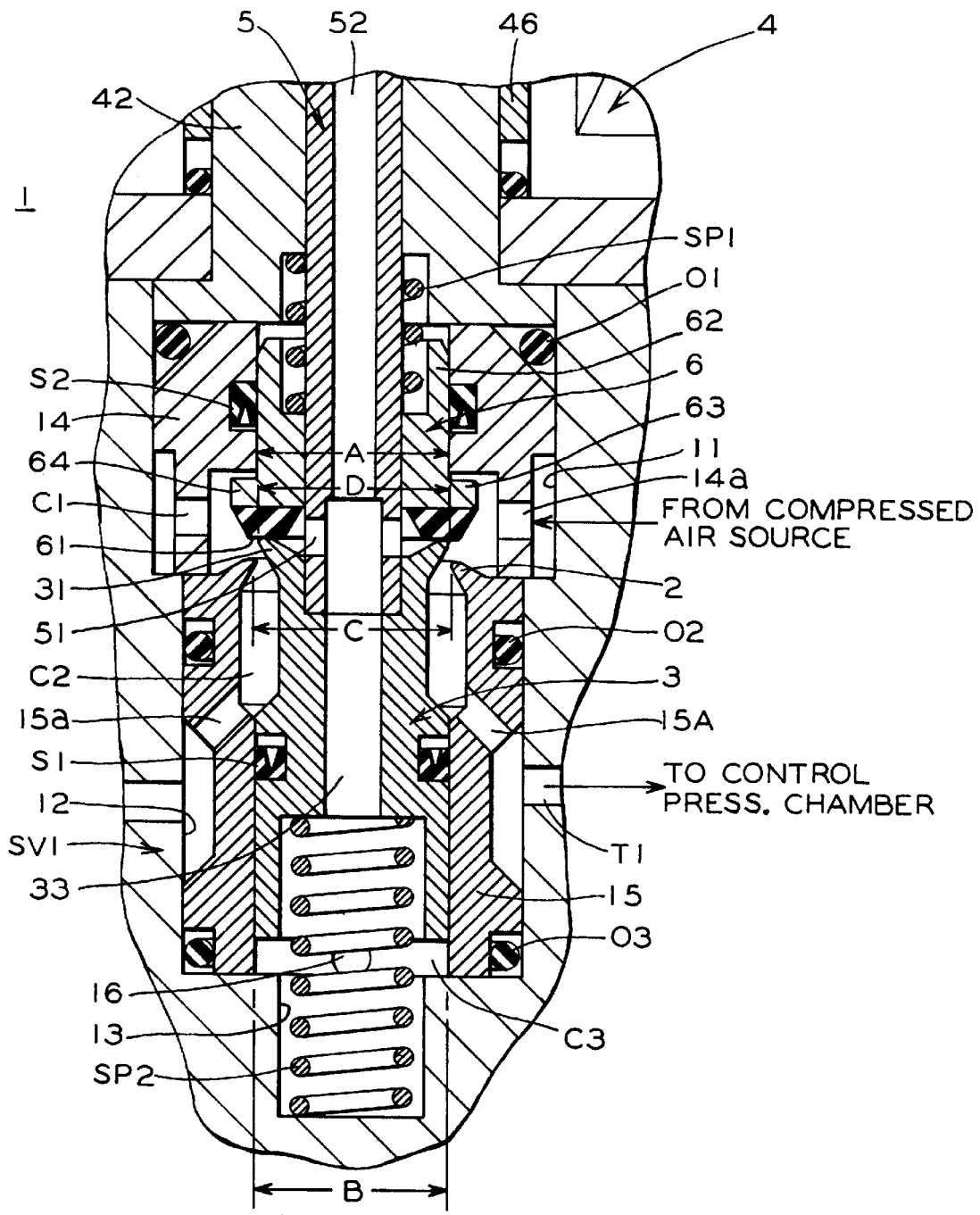
FIG. 4 is an enlarged cross sectional view illustrating the main parts of the solenoid valve switched to the contact position.

Referring also to FIG. 4, the main parts of solenoid valve SV comprise: a casing 1 in which are formed, in sequence, a first chamber C1 connected via an applied load valve to a pressurized air source, a second chamber C2 connected, via a control pressure passage T1 provided in the main valve body V1, to control pressure chamber C5 of such pressure control valve V, and a third chamber C3 in contact with the atmosphere via an exhaust passage T2 provided in main valve body V1. A fixed valve seat 2 is positioned between the first chamber C1 and the second chamber C2. Such solenoid valve SV further includes a hollow movable element 3 integrally formed with a movable valve seat 31 on its upper end, solenoid 4 and a pushing rod 5 for pressing and moving this movable element 3. A movable valve 6 is provided in first chamber C1, in a position in which there is a flush-seating surface 61 that faces fixed valve seating 2 and movable valve seating 31. A first spring SP1 urges this movable valve 6 in the direction of the fixed valve seating 2 and such movable valve seating 31 and a second spring SP2 urges movable element 3 and pushing rod 5 in a direction resisting the urging force of such first spring SP1.

Casing 1 is constructed from part of the upper casing Va of the pressure control valve V, and it has formed on its inside, in sequence concentrically from top to bottom, a first hole 11, a second hole 12 and a third hole 13 each of differing internal diameter. First chamber C1 is constructed from the hollow inside part of an annular first intermediate body 14 slotted into the first hole 11. First chamber C1 is in contact with a pressurized air source via a plurality of through holes 14a formed in the circumferential wall of the first intermediate body 14.

The second chamber C2 is constructed between such movable element 3 and the upper portion of the hollow inside portion of a hollow second intermediate body 15 slotted in second hole 12, and second chamber C2 is in contact with control pressure passage T1 via a plurality of through holes 15a which are formed in the circumferential wall of second intermediate body 15. Further, second chamber C2 is in contact with an accumulator via an auxiliary air supply passage T3 provided in the main valve body V1, being arranged in such a way that the air required for pilot pressure use can be supplied to the second chamber C2 with good responsiveness. Further, third chamber C3 is constructed from third hole 13 and the lower portion of the hollow inside portion of such second intermediate body 15. This third chamber C3 is in contact with exhaust passage T2 via an exhaust hole 16.

It will be noted that the space located between such first hole 11 and the first intermediate body 14 is sealed by a first seal O1 comprising an O-ring interposed between the two, and the space located between the second hole 12 and the second intermediate body 15 is sealed by a second seal O2 and a third seal O3 comprising O-rings interposed between the two.

Fixed valve seating 2 is integrally formed at the upper end of such second intermediate body 15. This fixed valve seating 2 has the shape of a tapered ring gradually decreasing in diameter toward the upper end thereof, and its upper end side projects toward the center.

Movable element 3 is formed as a cylindrical element, the upper portion of the outer circumference of which decreases in diameter, and its hollow inside portion 33 is formed in a stepped shape, the lower side of which has an increased diameter. As illustrated the lower portion of the outer circumference of movable element 3 is slotted with freedom to slide relative to the inner circumferential portion of such second intermediate body 15 disposed between the second chamber C2 and the third chamber C3, in an airtight state maintained by a first axial seal S1, and it is arranged in such a way that as it moves downward it can move the movable valve seating 31 from a position of flush seating against flush-seating surface 61 of movable valve 6, past the inside of fixed valve seat 2, and up to the second chamber C2. Further, the movable valve seating 31 is a petal-shaped one in which the diameter gradually increases toward the upper end thereof, and on its upper end side it projects toward such fixed valve seating 2.

Figure 3:
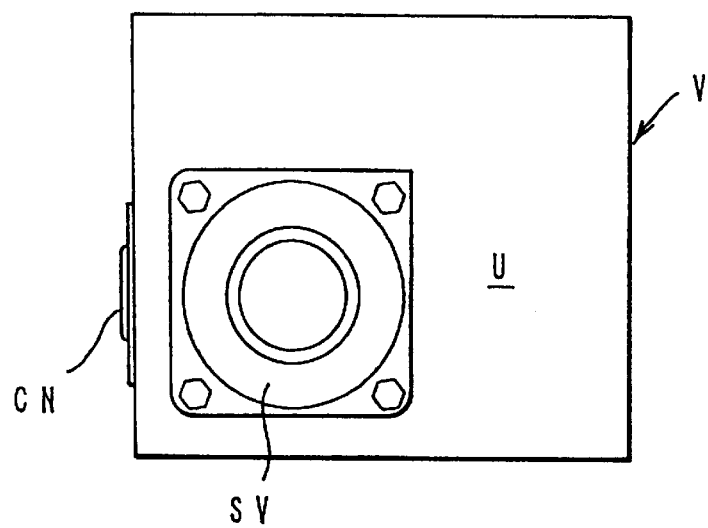
FIG. 3 is a plan view of the pressure control valve equipped with a solenoid valve illustrated in FIG. 1.

As can best be seen in FIG. 3, the solenoid 4 has its bottom side attached to the upper surface U of the upper casing Va of such pressure control valve V. This solenoid 4 is attached in such a manner that the whole of it is contained within the projected planar surface area of the main valve body V1.

The upper end portion of such pushing rod 5 is slotted into the lower portion of the inner circumference of a movable iron core 41 of solenoid 4, and a mid-course portion of the pushing rod 5 is inserted with freedom to slide in the inner circumference of a fixed iron core 42 of solenoid 4. Further, the lower end surface of such fixed iron core 42 abuts against the upper surface of such first intermediate body 14, and the space located between the two is sealed by the first seal O1.

The movable iron core 41 is guided in its sliding by a guide cylinder 46, and has formed on the inner circumference on its lower end portion an annular projection 41a tapering toward the end. This annular projection 41a restricts abrupt variations of the magnetic force of attraction of such solenoid 4 due to displacement of the movable iron core 41, thereby making the amount of displacement of the magnetic force of attraction and amount of displacement of the movable iron core 41 proportionate. Further, a peripheral chamber 43 for balancing the fluid pressure applied to such movable iron core 41 is formed above and below this movable iron core 41. It will be noted that such upper peripheral chamber 43 is occluded by a stopper 44 attached to a cover 45.

Pushing rod 5 has on its inside a communication hole 52 which establishes contact between the upper end side and the lower end side, and its lower end is slotted into the upper portion of the inner circumference of such movable element 3, in a position in which it is inserted with freedom to slide through the inside of the movable valve 6. Further, close to the lower end of such pushing rod 5 is formed a contact hole 51 which acts as a contacting portion for establishment of contact between the outer circumference side and the inner circumference side. Also, third chamber C3 and the peripheral chamber 43 of the upper portion of solenoid 4 are in contact via the hollow inside portion of such movable iron core 41, the communication hole 52 of the pushing rod 5, and the hollow inside portion 33 of movable element 3.

Movable valve 6 has a flat annular member 63, consisting of a resilient member, such as rubber, stuck to the lower surface of a short cylindrical support body 62, and the lower surface portion of this annular member 63 has been constructed as a flush-seating surface 61 for such fixed valve seating 2 and the movable valve seat 31. The outer circumference in the upper portion of support body 62 is slotted with freedom to slide relative to the inner circumference of such first intermediate body 14, in an airtight state maintained by a second axial seal S2 interposed between it and the first intermediate body 14, and thus flush-seating surface 61 of the movable valve 6 can be abutted against and separated from such fixed valve seat 2.

Diameter A of the airtight sliding portion of the movable valve 6 (the outer diameter of the part of support body 62 slotted into first intermediate body 14), effective valve seating diameter D of flush-seating surface 61 (the diameter of the part abutting movable valve seat 31), diameter B of the airtight sliding portion of such movable element 3 (the outer diameter of the part slotted into second intermediate body 15), and effective valve seating diameter C of fixed valve seating 2 (the diameter of the part abutting movable valve 6) are set so as to be more or less closely the same, thereby balancing the fluid pressure applied to the upper and lower surfaces of such movable element 3 and the movable valve 6. Consequently, it is possible to prevent variations in the magnetic force of attraction needed to move such movable element 3 and the movable valve 6, caused by an imbalance in the above-mentioned fluid pressure, and prevent the control action from becoming unstable.

The first spring SP1 is preferably a compression type coil spring, its upper portion being introduced into a gap disposed between such pushing rod 5 and the fixed iron core 42 of such solenoid 4, while its lower end is introduced into a gap located between the pushing rod 5 and the support body 62 of such movable valve 6, in which position it is put under compression in the space between such fixed iron core 42 and the support body 62. Therefore, when the movable element 3 moves downward, because of the urging force, it is possible to make such movable valve 6 accompany movable element 3 and, ultimately, it is possible to seat flush-seating surface 61 of such movable valve 6 flush against fixed valve seating 2.

The second spring SP2 is preferably a compression type coil spring, its upper portion is introduced into the lower portion of the inner circumference of such movable element 3, while its lower portion is introduced into the third hole 13 of casing 1, in which position it is put under compression in the space disposed between the movable element 3 and the bottom of third hole 13. The urging force of this second spring SP2 is set so as to be larger than the urging force of such first spring SP1, and thus, in the free state in which solenoid 4 is not magnetically excited, such movable valve 6 is pushed upward via the movable element 3 and is maintained in a state in which it is distanced from the fixed valve seat 2 due to the urging force of such second spring SP2.

Using the solenoid valve SV with the above configuration, when solenoid 4 is not magnetized, it is possible to use the urging force of such second spring SP2 to push such movable element 3 and pushing rod 5 upward against the urging force of such first spring SP1, to distance the movable valve seat 31 from such fixed valve seat 2, and to seat the movable valve seating 31 flush against flush-seating surface 61 of such movable valve 6. Therefore, it is possible to adopt a contact position (see FIG. 4) in which contact is established between the first chamber C1 and such second chamber C2. The third chamber C3 is isolated by the movable valve seating 31 and the movable valve 6, and thus pilot pressure can be supplied to the control pressure chamber C5 of such pressure control valve V.

At this time, because the operating pressure does not act on the guide cylinder 46 guiding the sliding of such movable iron core 41 of the solenoid 4, it is possible to prevent such guide cylinder 46 from distorting due to such operating pressure, and it is, also, possible to prevent any increase in the sliding friction of such movable iron core 41 and any reduction in the responsiveness of the solenoid 4 which would arise from any distortion of such guide cylinder 46. Furthermore, it is possible to prevent any reduction in the durability of such solenoid 4 due to the operating pressure being applied for a long time in the above-mentioned non-magnetized state. Moreover, in the above-mentioned contact state, the operating pressure similarly does not act on the stopper 44 occluding peripheral chamber 43 in the upper portion of such solenoid 4, and there is therefore no need to increase the strength by adding to the thickness of such stopper 44, to which extent the solenoid 4 can be made lighter in weight.

Figure 5:
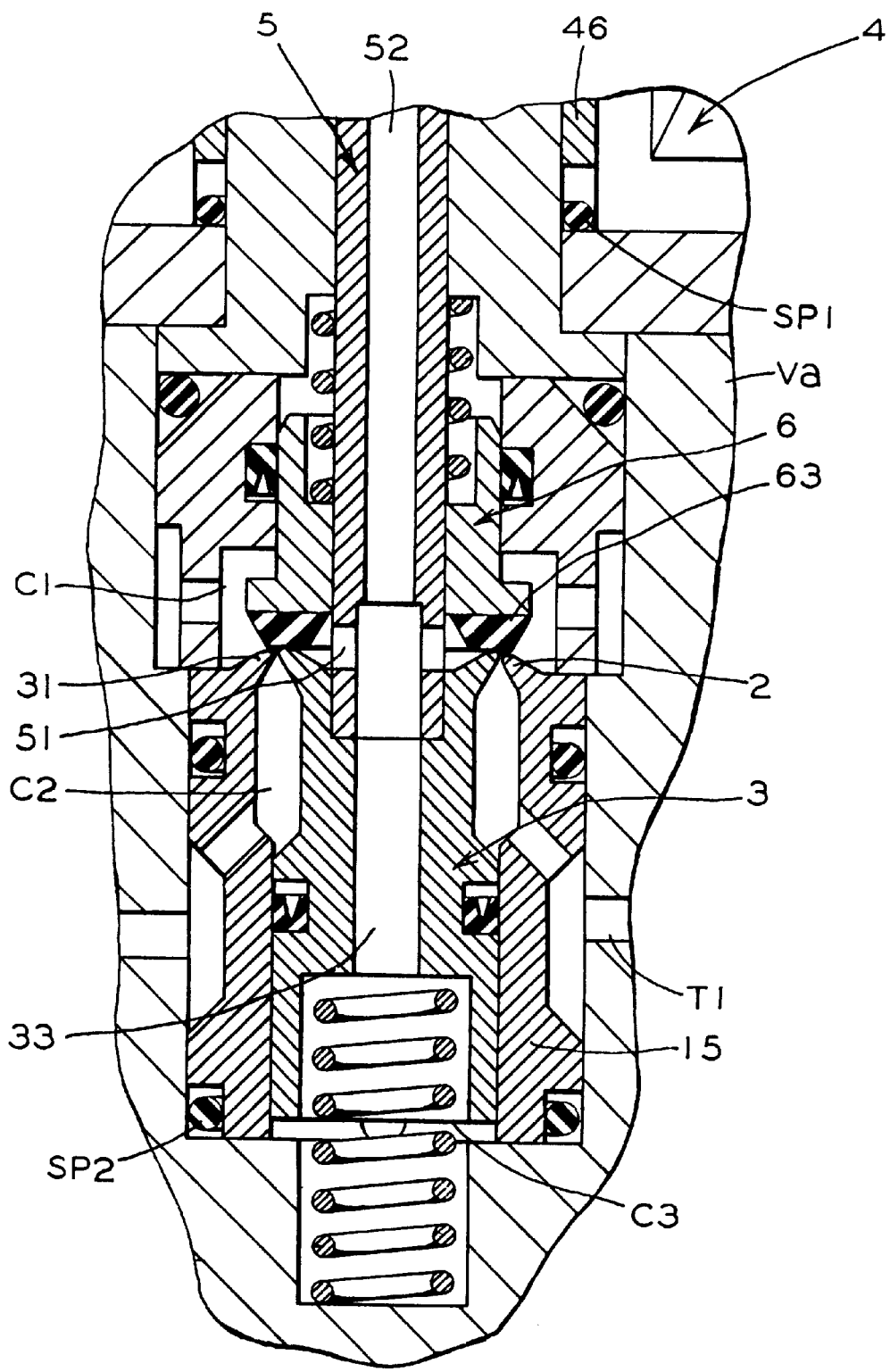
FIG. 5 is an enlarged cross sectional view illustrating the main parts of the solenoid valve switched to the isolation position.

On the other hand, when the solenoid 4 is magnetically excited using an electrical current value which produces a magnetic force of attraction equivalent to the difference between the urging force of such first spring SP1 and such second spring SP2 urging force, the magnetic force of attraction of such solenoid 4 can be applied to the moving element 3 via such pushing rod 5. As a result, the combined urging force from the magnetic force of attraction of the above-mentioned solenoid 4 and the urging force of the first spring SP1 can be used to move movable element 3 and movable valve 6 against the urging force of the second spring SP2, and the seat flush-seating surface 61 of such movable valve 6 flush against the fixed valve seat 2. Also, simultaneous with this flush-seating, the urging force of such second spring SP2 and the magnetic force of attraction of the solenoid 4 are in equilibrium and movement of such movable element 3 is stopped. At this time, the desirable position of flush-seating of movable valve seat 31 against movable valve 6 is maintained by the urging force of such second spring SP2. consequently, it is possible to adopt an isolation position (overlapping position) in which the first chamber C1, the second chamber C2 and the third chamber C3 are, respectively, isolated (see FIG. 5).

Figure 6:
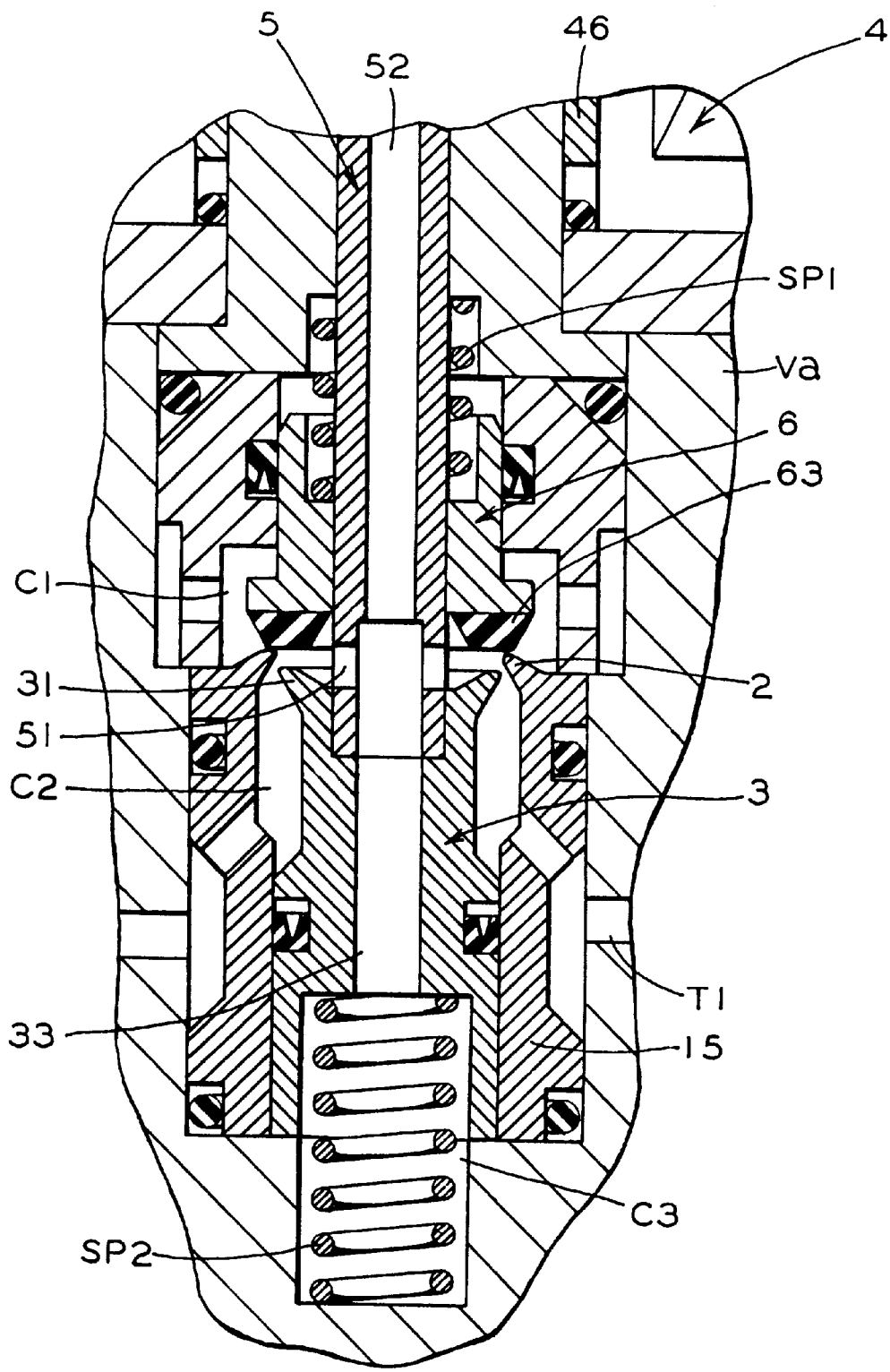
FIG. 6 is an enlarged cross sectional view illustrating the main parts of the solenoid valve switched to the exhaust position.

Further, if such solenoid 4 is magnetically excited using an electrical current value producing a magnetic force of attraction greater than the urging force of such second spring SP2, having switched to the above-mentioned isolation position for example, then it is possible to use the magnetic force of attraction of such solenoid 4 to push the movable element 3 further down via such pushing rod 5, and to thereby pull such movable valve seat 31 away from the flush-seating surface 61 of such movable valve 6. As a result, it is possible to establish the contact between such second chamber C2 and the hollow inside portion 33 of the movable element 3, via contact hole 51 provided in the vicinity of the lower end of such pushing rod 5. Consequently, it is possible to adopt an exhaust position in which contact is established between the second chamber C2 and the third chamber C3, and such first chamber C1 is isolated (see FIG. 6). Therefore, compressed air previously supplied through the control pressure passage T1 to the control pressure chamber C5 of such pressure control valve V can be discharged into the atmosphere through exhaust passage T2.

The presently preferred construction of such pressure control valve V will now be described. In this pressure control valve V, the main valve body V1 has formed in it, in the following sequence concentrically from top to bottom, an exhaust chamber C4 connected to an exhaust passage T2, a control pressure chamber C5 into which pilot pressure is input from the solenoid valve SV, a feedback chamber C6 into which feedback pressure is input from the brake cylinder (not shown), an output chamber C7 connected to the brake cylinder (not shown), and an air-supply chamber C8 connected to a compressed air source (also not shown).

The space disposed between such output chamber C7 and the air-supply chamber C8 is partitioned by an air-supply valve 7 and an air-supply valve seating 7a. Air-supply valve 7 is supported with freedom to slide up and down by means of a guide cylinder 71 provided in such air-supply chamber C8, and is pushed against the air-supply valve seating 7a by being continuously urged upward by a third spring SP3 put under compression in the space located between the portion at the back of the inside of such air-supply valve 7 and a floor cap K attached to the main valve body V1. It will be noted that the space disposed between the outer circumference of the lower portion of such air-supply valve 7 and such guide cylinder 71 is sealed by a third axial seal S3.

A pressure-adjusting piston 8 is interposed in the space located between the control pressure chamber C5 and the feedback chamber C6, and an exhaust valve rod 9 is integrally formed in the central portion of such pressure-adjusting piston 8. A flat thin film 81 is hermetically fitted in the outer circumference of such pressure-adjusting piston 8, and the outer circumference of this flat thin film 81 is sandwiched hermetically between the upper casing Va and the lower casing Vb of such main valve body V1. Consequently, the control pressure valve C5 and the feedback chamber C6 are hermetically partitioned by the pressure-adjusting piston 8 and flat thin film 81. It will be noted that such pressure-adjusting piston 8 is continuously urged toward such control pressure cylinder C5 by a pressure-adjusting spring 82.

The exhaust valve rod 9 is hollow, and its upper end faces the exhaust chamber C4 while its lower end faces the air-supply valve 7, respectively. At the lower end of such exhaust valve rod 9 there is constructed a movable valve 91 which is maintained in an airtight fashion against the air-supply valve 7 when such pressure-adjusting piston 8 has moved down. As shown in the drawings, this movable valve 91 is a petal-shaped one, the outer circumference of which is set to allow it to be inserted through the inner circumference of air-supply valve seating 7a. Exhaust valve rod 9 is able to move down to a position in which contact can be established between such air-supply chamber C8 and the output chamber C7 by distancing such air-supply valve 7 from the air-supply valve seating 7a.

A stepped partition ring R is interposed in the space located between the feedback chamber C6 and such output chamber C7, and contact is established between the two chambers C6 and C7 via a contact hole R1 formed in a stepped portion of such partition ring R.

It will be noted that the space disposed between the outer circumference of the upper portion of such exhaust valve rod 9 and the inner circumference of such exhaust chamber C4 is sealed by a fourth axial seal S4, and the space located between the outer circumference of the lower portion of such exhaust valve rod 9 and inner circumference of the partition ring R is sealed by a fifth axial seal S5.

As shown in FIGS. 2 & 3, in the tube seating attachment surface X of such pressure control valve V are formed a first port P1 that is connected to a pressurized air supply, a second port P2, that is connected to a brake cylinder, a third port P3 for inputting feedback pressure from the brake cylinder to the feedback chamber C6, a fourth port P4 for connecting the second chamber C2 of such solenoid valve SV with an accumulator, a fifth port P5 for connecting the first chamber C1 of such solenoid valve SV with an applied load valve, and a sixth port P6 for putting such exhaust passage T2 in contact with the atmosphere. Further, a connector CN of such solenoid valve SV is embedded in the upper portion of such tube seating attachment surface X such that the pressure control valve V can be easily fastened and unfastened.

The action of the pressure control valve V with the above configuration is as outlined below.

Figure 7:
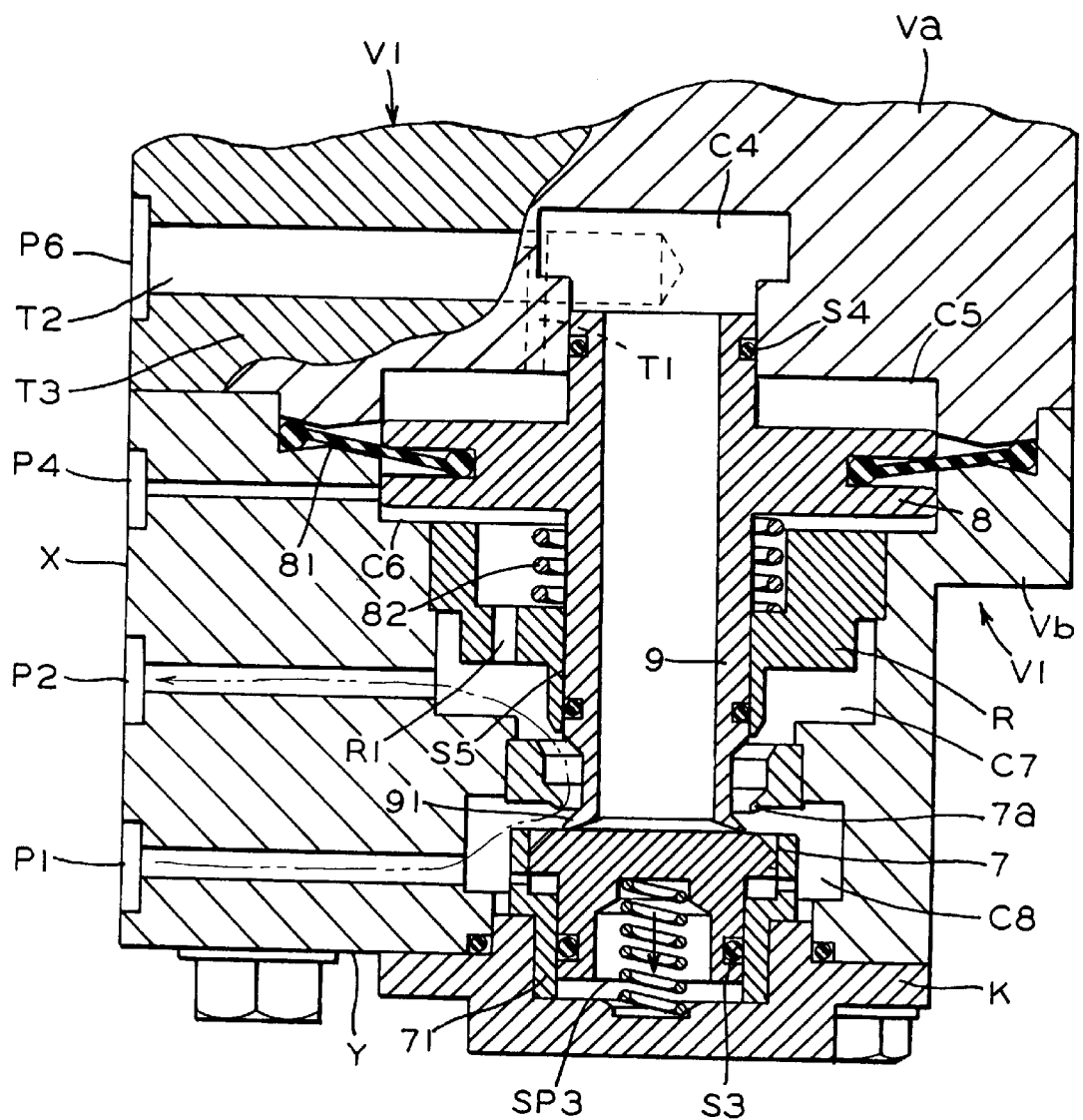
FIG. 7 is an enlarged cross sectional view illustrating the main parts of the pressure control valve switched to the supply position.

Firstly, when the pilot pressure being controlled by such solenoid valve SV is input through the control pressure passage T1 to the control pressure chamber C5 (see FIG. 4) such pressure-adjusting piston 8 will move down against the urging force of such pressure-adjusting spring 82, and so the exhaust valve rod 9 pushes such air-supply valve 7 down. Thereupon, such pressure control valve V assumes the supply position (see FIG. 7) in which contact is established between the output chamber C7 and such air-supply chamber C8, and compressed air input into such air-supply chamber C8 passes through the output chamber C7 and is supplied to a brake cylinder.

Figure 8:
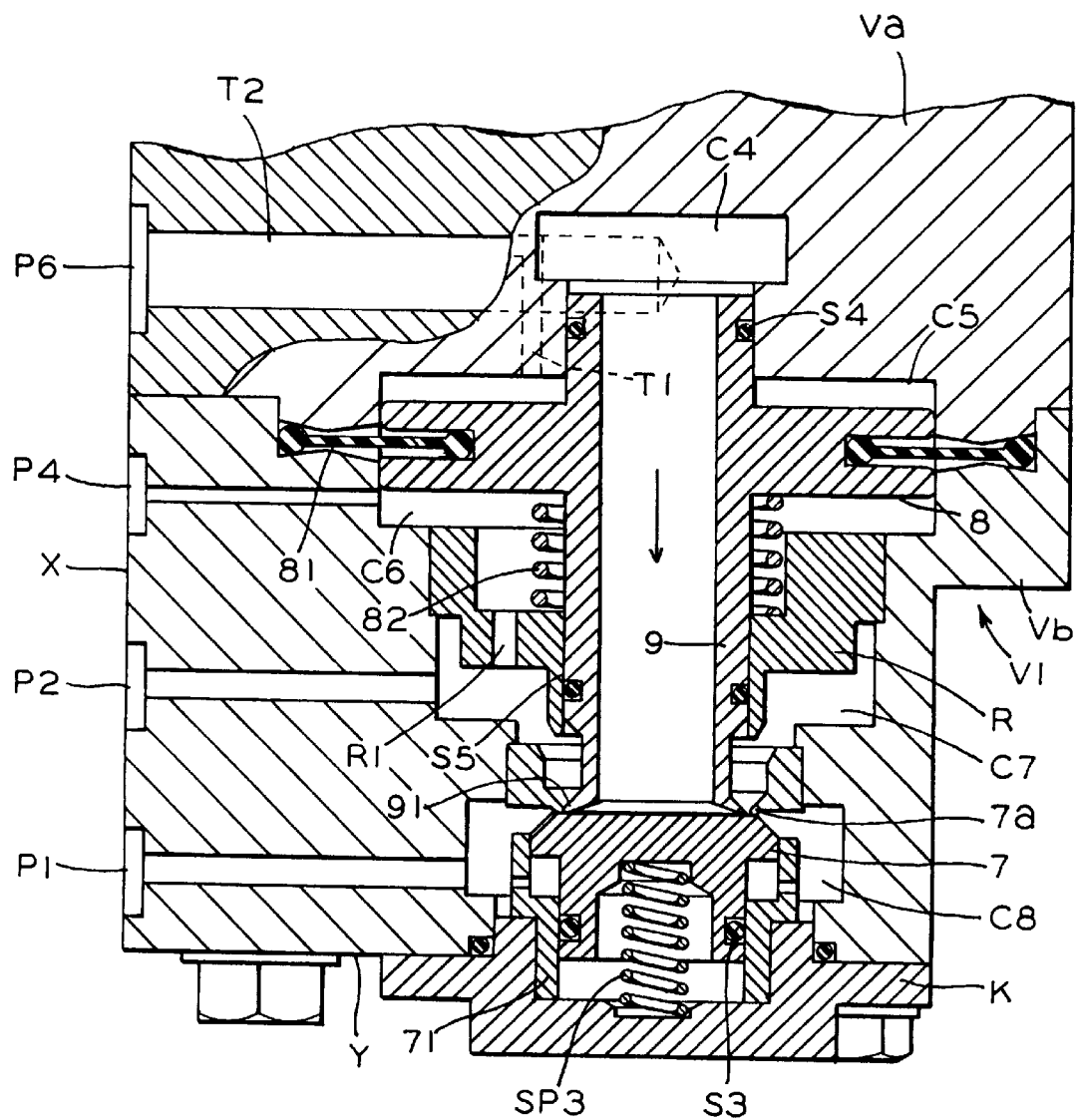
FIG. 8 is an enlarged cross sectional view illustrating the main parts of the pressure control valve switched to the isolation position.

Next, when the pressure in the control pressure chamber C5 becomes equal to the pressure in such feedback chamber C6, the pressure-adjusting piston 8 is pushed upward by the urging force of such pressure-adjusting spring 82. Thereupon, the air-supply valve 7 is pressed against such air-supply valve seating 7a due to the urging force of the third spring SP3, and so the supply of compressed air to the brake cylinder is isolated. Now, in this state, the state of airtight sticking between such air-supply valve 7 and the movable valve 91 at the lower end of such exhaust valve rod 9 is maintained. Consequently, such pressure control valve V assumes the isolation position (see FIG. 8) in which the output chamber C7 and the air-supply chamber C8, as well as such output chamber C7 and such exhaust chamber C4 are isolated.

Also, if the pilot pressure reduces, the pressure-adjusting piston 8 is pushed upward by the compressed air of such feedback chamber C6, and in this manner such movable valve 91 of such exhaust valve rod 9 is distanced from the air-supply valve 7. As a result, pressure control valve V assumes the exhaust position (see FIG. 1) in which the output chamber C7 and the supply chamber C8 are isolated, but contact is established between such output chamber C7 and the exhaust chamber C4, and the air in such output chamber C7 passes through the inside of the exhaust valve rod 9 and the exhaust passage T2 and is expelled into the atmosphere. Further, if the reduction in the pilot pressure stops and the pressures of such control pressure chamber CS and the feedback chamber C6 reach equilibrium, movable valve 91 will be seated flush against such air-supply valve 7 so that any exhausting will be stopped.

Consequently, compressed air can be supplied to the brake cylinder, having been amplified in volume, using a pressure matched with the pilot pressure output from solenoid valve SV.

With the above-mentioned pressure control valve V equipped with a solenoid valve SV, because the valve body SV1 of such solenoid valve SV is fitted in the upper surface U of the main valve body V1, in a state in which it is adjacent to the exhaust valve rod 9, it is possible to reduce the projected planar surface area. Therefore, it is possible to reduce the mounting space on the bottom of the floor of the vehicle. As a result, one can provide for efficient use of the space on the bottom of the floor of the vehicle, for example, other pieces of apparatus can be placed on the bottom of the floor. In particular, in the above presently preferred embodiment of the invention, because the solenoid 4 of such solenoid valve SV is placed inside the projected planar surface area of such valve main body V1, the above-mentioned mounting space can be minimized.

Further, because the valve body SV1 of such solenoid valve SV is placed in toward the tube seating attachment surface X of such main valve body V1, it is possible to shorten, inter alia, the control pressure passage T1 linking the second chamber C2 of such solenoid valve SV and the control pressure chamber CS, and the air passage linking the fourth port P4 and the first chamber C1 of such solenoid valve SV. Therefore, the pilot pressure can be supplied to such control pressure chamber C5 with good responsiveness.

The pressure control valve V equipped with a solenoid valve SV of this invention is not limited to the above-mentioned embodiment and various alternative design modifications can be carried out, for example, fitting such solenoid valve SV in the lower surface Y of such main valve body V1, or the like.

As outlined above, because the pressure control valve V is equipped with a solenoid valve SV of this invention, the valve body SV1 of such solenoid valve SV is fitted in the upper surface U or lower surface Y of the main valve body V1 in a position in which it is adjacent to the exhaust valve rod 9, so it is possible to reduce the projected planar surface area. Therefore, it is possible to reduce the mounting space on the bottom of the floor of a vehicle, or wherever, and it is consequently possible to provide for efficient use of the mounting space.

In particular, when the valve body SV1 of such solenoid valve SV is placed in toward the tube seating attachment surface X of the main valve body V1, in a position in which it is adjacent to the control pressure chamber C5, it is possible to shorten the air passage between the tube seating attachment-surface X and the control pressure chamber C5 and such solenoid valve SV and, therefore, the pilot pressure can be supplied to the control pressure chamber C5 with good responsiveness.

Further, when the solenoid 4 of the solenoid valve SV is placed inside the projected planar surface area of the main valve body VI, the above-mentioned mounting space can be minimized.

Again, when a connector of the solenoid valve SV is placed on the tube seating attachment surface X of the above-mentioned main valve body V1, fastening and unfastening of the pressure control valve V equipped with a solenoid valve SV is facilitated.

While a presently preferred and a number of alternative embodiments of the present invention have been described in detail above, it should be understood that various other adaptations and/or modifications of pressure control valves and solenoid valves may be envisioned by those persons who are skilled in the relevant art without departing from either the spirit of the invention or the scope of the appended claims.

We claim:

1. A pressure control valve equipped with a solenoid valve, in which a main valve body is provided with an air-supply chamber connected to a pressurized air source, a control pressure chamber into which pilot pressure is input, an output chamber connected to an air-pressure apparatus, an air-supply valve which establishes contact between and isolates said air-supply chamber and said output chamber, a pressure-adjusting piston which is urged in a first direction by a pressure-adjusting spring and is urged in an opposed second direction by said pilot pressure of said control pressure chamber, and with a hollow exhaust valve rod provided integrally with said pressure-adjusting piston for opening or closing said air-supply valve in accordance with said pilot pressure; and in which said solenoid valve supplying said pilot pressure to said control pressure chamber is attached to said main valve body; characterized in that:

(a) said valve body of said solenoid valve is (i) fitted in one of an upper surface and a lower surface of said main valve body, in a position in which said valve body is adjacent to said exhaust valve rod and thus adjacent to said pressure control chamber to which said solenoid valve supplies said pilot pressure through a short control passage and (ii) placed in proximity to a tube seating attachment surface of said main valve body, said tube seating attachment surface accommodating inlet and outlet ports for said pressure control valve and a connector of said solenoid valve; and (b) a solenoid of said solenoid valve is placed inside a projected planar surface area of said main valve body to reduce the space required to mount said pressure control valve in the environment in which it is to be used.

2. A pressure control valve equipped with a solenoid valve, as claimed in claim 1, in which said connector of said solenoid valve is placed on said tube seating attachment surface of said main valve body.

* * * * *